United States Patent [19]

Noguchi et al.

[11] Patent Number: 5,402,173
[45] Date of Patent: Mar. 28, 1995

[54] IMAGE PICKUP SYSTEM

[75] Inventors: Yoshimitsu Noguchi; Tomomichi Nakai; Yoshihito Higashitsutsumi, all of Gifu, Japan

[73] Assignee: Sanyo Electric Co., Ltd., Osaka, Japan

[21] Appl. No.: 199,965

[22] Filed: Feb. 22, 1994

Related U.S. Application Data

[63] Continuation of Ser. No. 888,605, May 27, 1992, abandoned.

[30] Foreign Application Priority Data

May 27, 1992 [JP] Japan ................... 3-121128

[51] Int. Cl.⁶ .......................................... H04N 5/335
[52] U.S. Cl. ................................. 348/322; 348/312
[58] Field of Search ............... 348/322, 323, 324, 294, 348/297, 295, 305, 317, 312; H04N 5/335

[56] References Cited

U.S. PATENT DOCUMENTS 4,580,170 4/1986 Levin ..................... 358/213.25
5,040,057 8/1991 Gilbiom et al. .......... 358/213.26

FOREIGN PATENT DOCUMENTS 61-230583 10/1986 Japan ............... H04N 7/01
62-282378 12/1987 Japan ............... G06F 15/66
3-198485 8/1991 Japan .
3-198486 8/1991 Japan ............... H04N 5/335

OTHER PUBLICATIONS

"Liquid–Crystal (Edited for application)" pp. 189–194, published from Kabushiki Kaisha Baifukan, 1985.

Primary Examiner—Joseph Mancuso
Assistant Examiner—Tuan V. Ho
Attorney, Agent, or Firm—Armstrong, Westerman, Hattori, McLeland & Naughton

[57] ABSTRACT

An image pickup section includes the number of pixels in the vertical direction which is decreased one-half less than the number of scan lines. A signal containing image components is outputted every one horizontal line. The horizontal line containing the image components in an odd field is offset from that in an even field by one line. In both the odd and even fields, leach of these image signals are multiplexed on a signal delayed by one horizontal scan period to form an image signal which contains the same image components for each two horizontal lines. This image signal is then displayed in the non-interlace manner.

5 Claims, 5 Drawing Sheets

IMAGE PICKUP SYSTEM

This application is a continuation of application Ser. No. 07/888,605, filed May 27, 1992, now abandoned.

BACKGROUND OF THE INVENTION

1. Field of the Invention

The present invention relates to an image pickup/reproduction apparatus including a solid state image pickup element and more particularly to such an apparatus improved by reducing the size of the solid state image pickup element.

2. Description of the Related Art

If a TV monitor is of NTSC type, a picture is generally reproduced with 240 pixels in the vertical direction and 324 pixels in the horizontal direction for each field. The image pickup apparatus thus requires a solid state image pickup element having the pixels at least in the reproduced picture, When the solid state image pickup element has an increased number of pixels, it is required to be more highly integrated, however leads to decrease a ratio in yield and increase in cost. This results in higher price of TV cameras. A proposal has been made which reduces the manufacturing cost of the image pickup/reproduction system by decreasing the number of pixels in the solid state image pickup element.

Figure 1:
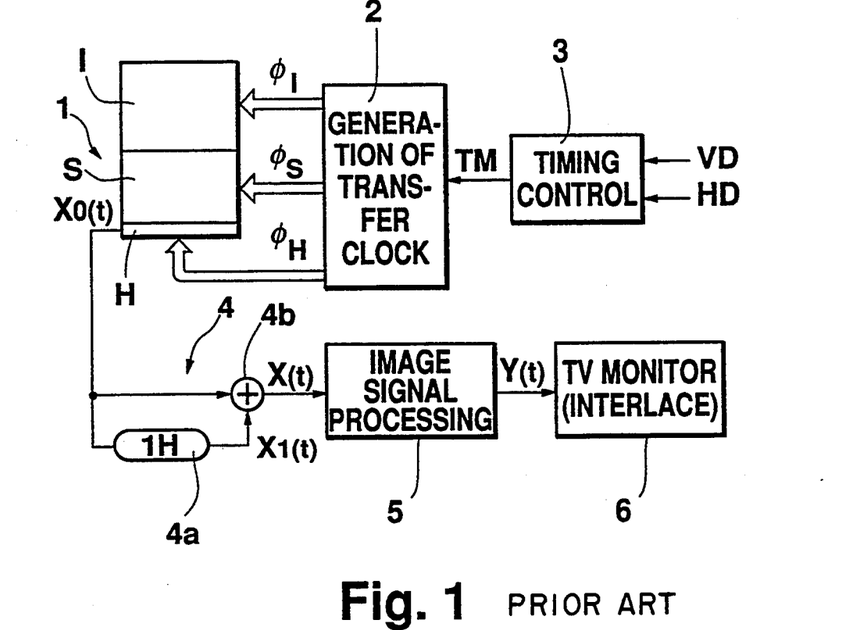
FIG. 1 is a block diagram of an image pickup apparatus constructed in accordance with the prior art.
Figure 2:
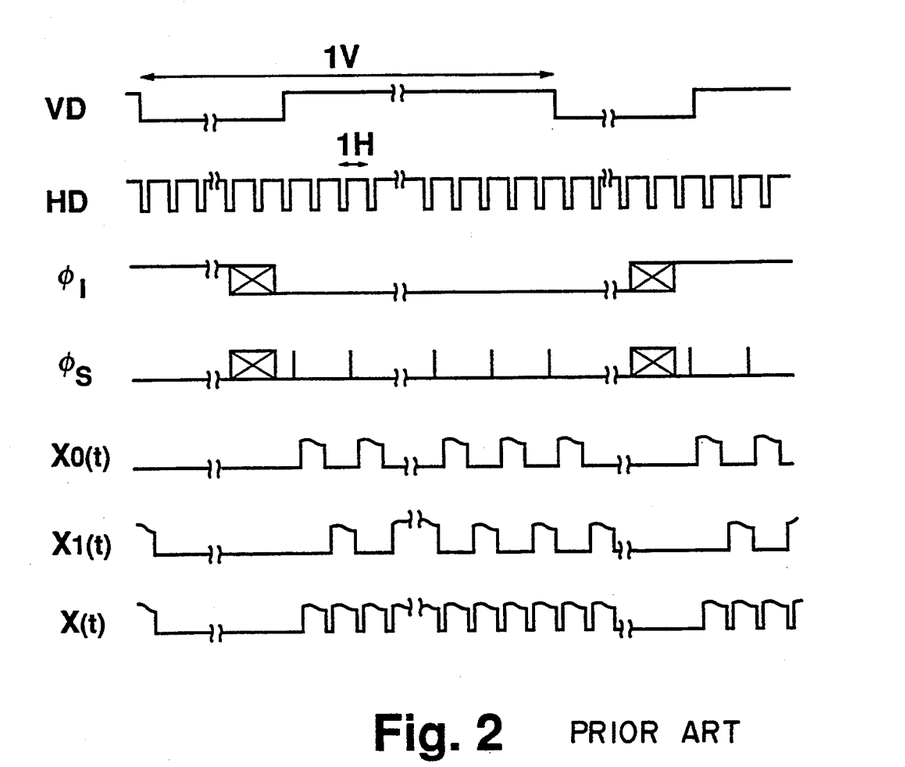
FIG. 2 is a timing diagram illustrating the operation of the image pickup apparatus shown in FIG. 1.

FIG. 1 is a block diagram illustrating an image pickup/reproduction system which utilizes an image pickup element having a number of pixels decreased one-half less than the conventional image pickup elements. FIG. 2 is a timing diagram illustrating the operation of such an image pickup/reproduction system.

A frame transfer type CCD solid state image pickup element 1 comprises an image pickup section I, an accumulating section S and a horizontal transfer section H. The image pickup section I includes the number of pixels decreased one-half less than the conventional image pickup elements in the vertical and horizontal directions, respectively. With NTSC type, for example, the number of pixels is equal to 120 in the vertical direction and to 162 in the horizontal direction, for each field. The image pickup element 1 is driven by pulses from a transfer clock generator 2 to transfer an electric charge accumulated for each pixel. In this example, the image pickup section I, accumulating section S and horizontal transfer section H receive vertical transfer clocks $\Phi_I$, accumulation/transfer clocks $\Phi_S$ and horizontal transfer clocks $\Phi_h$, respectively. The transfer clock generator 2 provides the pulses $\Phi_I$, $\Phi_S$ and $\Phi_H$ to the respective section in the image pickup element 1 in accordance with timing signals $T_M$ which are prepared by a timing control circuit 3 based on vertical and horizontal scan signals VD, HD. Thus, image signals will be provided from the solid state image pickup element 1 in synchronism with the signals VD and HD.

In the above-mentioned image pickup element 1, however, the transfer of information charges from the accumulating section S to the horizontal transfer section H with transfer pulses having the same period as that of the horizontal scan signals HD cannot form any picture in TV since this transfer terminates one-half of one vertical scan period to provide only one-half of the necessary number of scan lines for image signals. To overcome such a problem, the frequencies of the accumulation/transfer and horizontal transfer pulses $\Phi_S$ and $\Phi_H$ are set one-half less than the frequency of the horizontal scan signals HD. More particularly, the transfer of information charges from the accumulating section S to the horizontal transfer section H is carried out every two horizontal scan periods. Image signals $X_{0(t)}$ from the image pickup element 1 will contain image components every other horizontal scan period. In order to obtain a continuous image signal from the intermittent image signals which contain image components every one horizontal scan period in the two horizontal scan periods, the solid state image pickup system comprises an interpolation circuit 4 which comprises a delay circuit 4a for delaying the signals by one horizontal scan period and an adder 4b for adding the signals. The interpolation circuit 4 provides image signals $X_{1(t)}$ by delaying the image signals $X_{0(t)}$ by one horizontal scan period. The adder 4b adds the image signals $X_{1(t)}$ to the image signals $X_{0(t)}$ to form a continuous image signal $X_{(t)}$. Such a continuous image signal $X_{(t)}$ is then subjected to various processings such as sample hold, amplification and so on at a signal processing circuit 5 to provide an image signal $Y_{(t)}$ which in turn is fed to a TV monitor 6.

In this connection, the accumulation/transfer pulses contain a group of pulses for receiving the information charges from the image pickup element every one vertical scan period, in addition to the pulses for transferring the information charges to the horizontal transfer section H every two horizontal scan periods.

In such an arrangement, each two horizontal scan lines of the signal $X_{(t)}$ is formed by the same image component. Thus, a satisfactory image pickup apparatus may be obtained from such an image pickup element 1 having the decreased number of pixels. However, when the image signal $X_{(t)}$ obtained by pre-interpolating the image signals $X_{0(t)}$ for each one horizontal scan period is reproduced on the TV monitor 6 by the interlace scan, there exists a horizontal scan line for image components in one field between two horizontal scan lines for image components in another field. Therefore, the vertically positional relationship in the picture will be inverted partially to lower the quality of the reproduced picture.

The inventors has proposed, in Japanese Patent Application No. Hei 1-337359 (Laid-Open No. Hei 3-198485), an image pickup system which intends to improve the image quality by preventing the reproduced picture from being inverted. Such a patent application also describes the prior art mentioned above.

Figure 3:
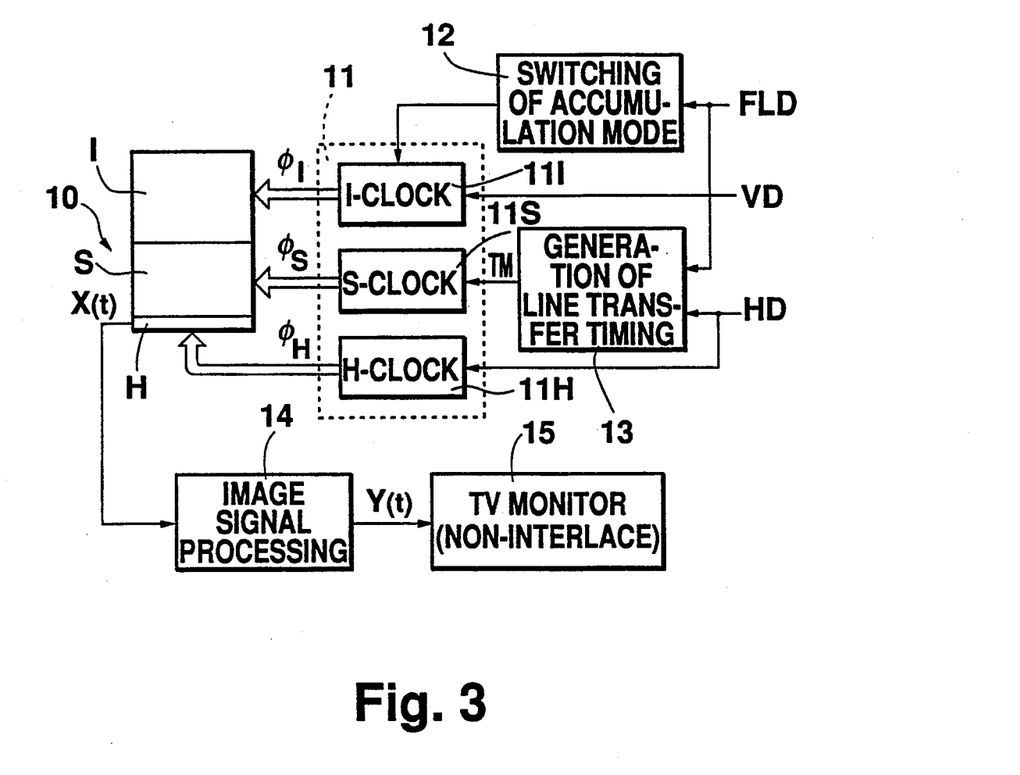
FIG. 3 is a block diagram of another image pickup apparatus Comprising means for preventing the inverted display of a reproduced scene.

FIG. 3 is a block diagram showing the proposed image pickup apparatus.

The image pickup apparatus comprises a CCD solid state image pickup element 10 which comprises a image pickup section I for receiving an image, an accumulating section S for temporarily accumulating information charges and a horizontal transfer section H for transferring and outputting the information charges every one line. As in FIG. 1, the image pickup section I includes the number of pixels decreased one-half less than that of the conventional image pickup elements in each of the vertical and horizontal directions. Naturally, the accumulating and horizontal transfer sections S, H also include the number of pixels decreased corresponding to the image pickup section I.

The image pickup apparatus also comprises a transfer clock generator 11 which comprises a vertical transfer clock generating circuit 11I, an accumulation/transfer clock generating circuit 11S and a horizontal transfer clock generating circuit 11H. Thus, various parts in the CCD 10 receive vertical transfer clocks $\Phi_I$, accumulation/transfer clocks $\Phi_S$ and horizontal transfer clocks $\Phi_H$, respectively. These transfer clock generating circuits 11I, 11S and 11H are operated in accordance with vertical and horizontal scan signals VD and HD and changed in operation mode for each field. The vertical transfer clock generating circuit 11I is adapted to drive the image pickup section I in accordance with the output of an accumulation mode switching circuit 12 which is operated in accordance with field identifying signals FLD. More particularly, during accumulation of the information charges., the vertical transfer clock generating circuit 11I provides, to the image pickup section I, such a potential that mixes pixel charges on an odd line in an odd field into pixel charges on the next line and also that mixes pixel charges on an even line in an even field into pixel charges on the next line. On passage of a Given accumulation period, the vertical transfer clock generating circuit 11I transfers the information charges from the image pickup section I to the accumulation section S. The accumulation/transfer clock generating circuit 11S Generates clocks for receiving the information charges from the image pickup section I and line transfer pulses for transferring the received information charges to the horizontal transfer section H for each line. Timing of generating each transfer pulse is set to synchronize with the horizontal scan signal HD in a horizontal scan blanking period every one horizontal scan period, in accordance with the output $T_M$ of a line transfer timing generating circuit 13 which operates in accordance with the field identifying and horizontal scan signals FLD, HD. This is similar to the clocks $\Phi_S$ shown in FIG. 2. In this example, however, the timing of generating the line transfer pulse is set such that the odd field is delayed from the even field by one horizontal scan period. More particularly, the information charges accumulated in the image pickup section I at an even field are outputted from the accumulating section S through the horizontal transfer section H at the next odd field. Therefore, an odd field signal corresponding to a charge obtained by mixing pixels on an odd line into pixel on the next line will be outputted to the previous one of a pair of two horizontal lines while an even field signal corresponding to a charge obtained by mixing pixels on an even line to pixels on the next line will be outputted to the following one of the paired horizontal lines. In such a manner, the image signal $X_{(t)}$ outputted from the image pickup element 10 will contain image components at any odd-numbered horizontal scan line at the odd field and at the same time image components at any even-numbered horizontal scan line at the even field.

Figure 4A:
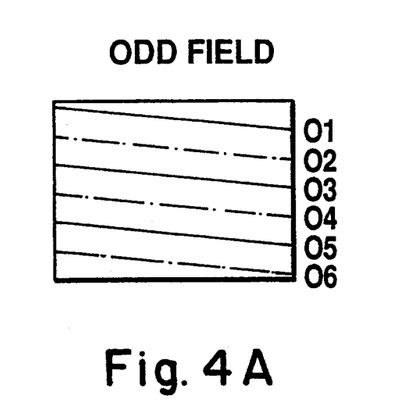
FIG. 4A showing an odd field and FIG. 4B showing an even field.
Figure 4B:
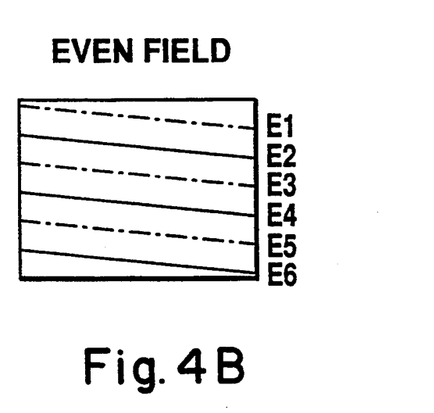

Such an image signal $X_{(t)}$ is then subjected to various processings such as sample hold, amplification and so on at the image signal processing circuit 14 and supplied to a TV monitor 15 as an image signal $Y_{(t)}$. In the TV monitor 15, the image signal $Y_{(t)}$ is reproduced by non-interlace scan. As a result, a picture will be imaged on the reproduced scene of the TV monitor 15 in a first field at an odd-numbered horizontal scan line and subsequently in a second field at an even-numbered horizontal scan line. If a scene is to be reproduced by the use of six horizontal scan lines, for example, six horizontal scan lines 01–06 are imaged in an odd field ODD as shown in FIG. 4A while other six horizontal scan lines E1–E6 are imaged in an even field EVEN as shown in FIG. 4B. These horizontal scan lines are coincide with each other at both the odd and even fields since they are imaged by non-interlace scan. Further, since the image signal $X_{(t)}$ contains image components in the odd field ODD during the odd-numbered horizontal scan period, the picture is displayed on the odd-numbered horizontal scan lines 01, 03 and 05 in the odd field ODD, as shown by solid line in FIG. 4A. However, the picture will not be displayed on the even-numbered horizontal scan lines 02, 04 and 06 at all, as shown by one-dotted chain line in FIG. 4A. In the contrary, the picture is displayed on the odd-numbered horizontal scan lines E2, E4 and E6 in the even field EVEN as shown by solid line in FIG. 4B and not displayed on the odd-numbered horizontal scan lines E1, E3 and E5 as shown by one-dotted chain line in FIG. 4B. This is because the image signal $X_{(t)}$ contains the image components at the even-numbered horizontal scan lines in the even field EVEN. If the odd and even fields are repeatedly used, the picture will be displayed on all the horizontal scan lines in the reproduced scene.

Although the above-mentioned image pickup apparatus has the number of horizontal scan lines which is smaller than that of the image signal $X_{(t)}$ obtained by the image pickup apparatus of FIG. 1, it can effectively prevent the reduction of resolution in the reproduced scene since the positional relationship between the picture and the reproduced scene will not be partially inverted with a uniform spacing between each pair of adjacent horizontal scan lines to be displayed.

However, the horizontal scan lines used to define a reproduced scene display the picture every one line in each field. Therefore, the scene becomes more dark with reduction of the contrast. The reduction of resolution can be prevented while sacrificing the quality of image.

SUMMARY OF THE INVENTION

It is therefore an object of the present invention to provide an image pickup/reproduction system utilizing an image pickup element of the aforementioned type which can improve the image quality by preventing the resolution from being reduced by the inversion of image on a reproduced scene while preventing the contrast from being lowered.

To this end, the present invention provides an image pickup/reproduction system including a solid state image pickup element having the decreased number of pixels in the vertical direction, said apparatus comprising an image pickup section having the number of vertical pixels decreased one-half less than the number of horizontal scan lines; transfer means for transferring information charges obtained by said image pickup section in the vertical direction every one horizontal scan period and for transferring and outputting said information charges transferred in the vertical direction for one horizontal period each time when said information charges are received, said transfer means having image components on each horizontal line; timing control means for setting the vertical transfer timing in said transfer means such that an odd field will be offset from an even field by one horizontal scan period; interpolating means for delaying the image signal outputted from said solid state image pickup element by one horizontal scan period and for synthesizing the delayed image signal with the image signal from said solid state image pickup element to multiplex the delayed image components on a horizontal line which contains no image component; and reproduction means for reproducing a scene belonging to the interpolated image signals on a display means by imaging the same scan line in the respective fields.

The present invention also provides an image pickup/reproduction system including a solid state image pickup element having the decreased number of pixels in the vertical direction, said apparatus comprising an image pickup section having the number of vertical pixels decreased one-half less than the number of horizontal scan lines; transfer means for transferring information charges obtained by said image pickup section in the vertical direction every one horizontal scan period and for transferring and outputting said information charges transferred in the vertical direction in the horizontal direction for one horizontal period each time when said information charges are received, said transfer means being adapted to provide an image signal containing image components on each horizontal line; timing control means for setting the vertical transfer timing in said transfer means such that an odd field will be offset from an even field by one horizontal scan period; interpolating means for delaying the image signal outputted from said solid state image pickup element by one horizontal scan period and for synthesizing the delayed image signal with the image signal from said solid state image pickup element to multiplex the delayed image components on a horizontal line which contains no image component; and reproduction means including a liquid-crystal display panel for displaying a scene according to the interpolated image signals, said liquid-crystal including display pixels in odd- and even-numbered lines which are alternately arranged, the display pixels on any adjacent lines being simultaneously scanned.

In such an arrangement, the image components multiplexed every one horizontal scan period are interpolated for each horizontal scan period. By reproducing the interpolated image components on the same scan line in the odd and even fields, the odd-numbered scan lines are displayed by the non-delayed image components while the even-numbered scan lines are displayed by the delayed image components, in the odd fields. In the even fields, the even-numbered scan lines are displayed by the non-delayed image components while the odd-numbered scan lines are displayed by the delayed image components. Consequently, the scan lines can be displayed equidistantly in the respective fields, so that the reproduced scene can be displayed without inversion of the taken image.

BRIEF DESCRIPTION OF THE DRAWINGS

FIG. 4 is a diagrammatic view of a reproduced scene.

FIG. 7 is a diagrammatic view of a reproduced scene.

FIG. 8 is a diagrammatic view illustrating the arrangement of display pixels in a double-matrix liquid-crystal display panel.

DETAILED DESCRIPTION OF THE PREFERRED EMBODIMENTS

Figure 5:
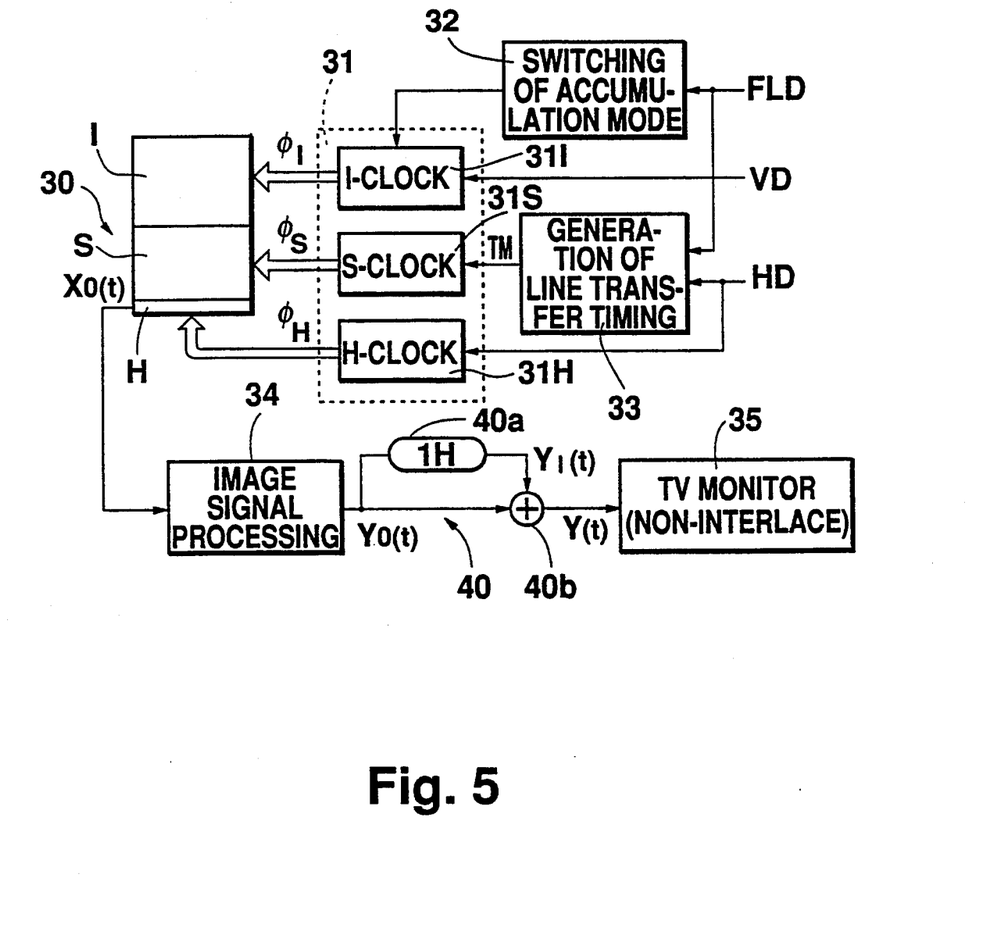
FIG. 5 is a block diagram of an image pickup apparatus constructed in accordance with the present invention.
Figure 6:
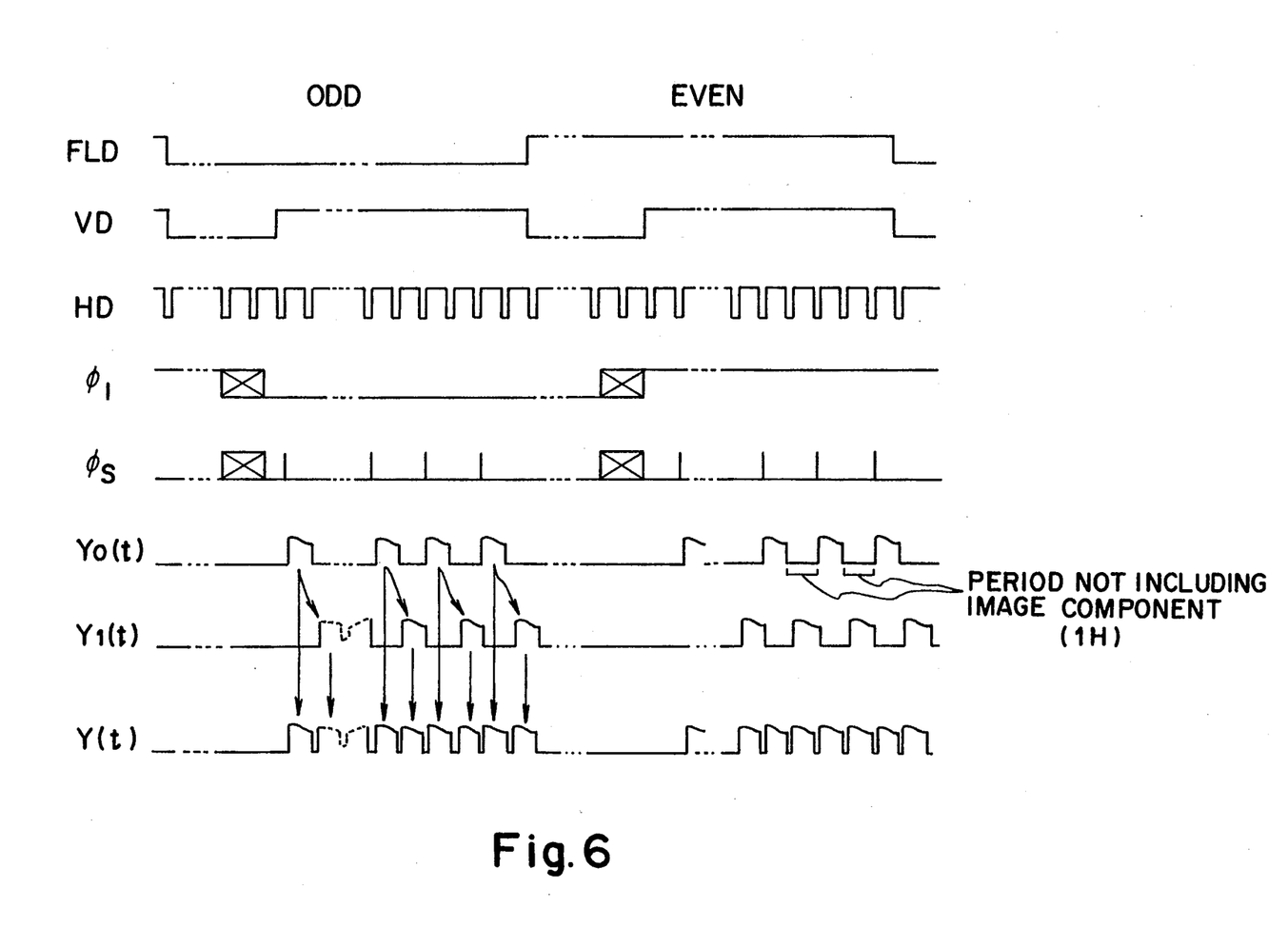
FIG. 6 is a timing diagram illustrating the operation of the image pickup apparatus shown in FIG. 5.

Referring now to FIGS. 5 and 6, there is shown an image pickup/reproduction system of the present invention, comprising an image pickup element 30 which comprises an image pickup section I, an accumulating section S and a horizontal transfer section H. As in the prior art, the number of pixels in each of the vertical and horizontal directions is decreased one-half less than that of a scene to be reproduced. The number of pixels in each of the accumulating section S and horizontal transfer section H is decreased corresponding to the image pickup section I. More particularly, the accumulating section S includes the number of pixels decreased one-half in either of the horizontal and vertical directions while the horizontal transfer section H includes the number of pixels corresponding to one line in the vertical direction and the number of pixels decreased one-half in the horizontal direction, matching against the image pickup section I.

The image pickup/reproduction system also comprises an accumulation mode switching circuit 32 which receives a switching timing at each field, that is, a field identifying signal FLD in which H- and L-levels are inverted at the trailing edge of a signal VD. The accumulation mode switching circuit 32 provides a signal corresponding to the field identifying signal FLD to a vertical transfer clock generating circuit 31I. The vertical transfer clock generating circuit 31I also receives a vertical synchronization signal VD and generates a vertical transfer clock $\Phi_I$ for transferring electric charges from the image pickup section I to the accumulating section S, during a blanking period in which the vertical synchronization signal VD becomes L-level.

The vertical transfer clock $\Phi_I$ comprises pulses corresponding in number to the number of horizontal lines in the image pickup section I. These pulses are used to transfer the charges accumulated in the image pickup section I to the accumulating section S. The vertical transfer clock generating circuit 31I provides, to the image pickup section I, such a potential that mixes information charges produced at pixels on an even-numbered line with information charges produced at pixels on the next odd-numbered line in an odd field and also information charges produced at pixels on an odd-numbered line with information charges produced at pixels on the next even-numbered line in an even field, during a period that the charges are being accumulated. As described, the vertical transfer clock generating circuit 31I then transfers the charges in the vertical direction. Thus, the horizontal lines of the charges accumulated in the odd and even fields will be offset from each other to attain an interlace scan.

For example, the image pickup section I may comprise a double electrode structure arranged therein which comprises four electrodes receiving four phases of vertical transfer clock $\Phi_I$. If the potentials in these electrodes are suitably set, a stepped potential can be formed in the image pickup section I so that the charges will be collected to a given point during an accumulation period. In this case, during the accumulation period, the vertical transfer clock $\Phi_I$ is set as follows: In an odd field, clocks in the first and second phases are set at H-level and clocks in the third and fourth phases are set at L-level. In an even field, clocks in the first and second phases are set at L-level while clocks in the third and fourth phases are set at H-level. In the image pickup section I, thus, the potential at the pixels in the odd field becomes different from that at the pixels in the even field. It is assumed that the image pickup section I is divided into four parts a, b, c and d which are classified into a division. If such a division is repeated, for example, in an odd field, the part b of a division will gather information charges in the parts c and d of another adjacent division and in the parts a and b of the first-mentioned division. In an even field, the part d of a division will gather information charges in the parts a, b, c and d of the same division.

The information charges are then transferred from the image pickup section I to the accumulating section S by means of the vertical transfer clocks $\Phi_I$ during the blanking period of the vertical scan signals VD. A line timing generating circuit 33 provides a timing signal TM based on HD to an accumulation/transfer clock generating circuit 31S. However, the line timing generating circuit 33 also receives the field identifying signal FLD. The timing signal TM in the odd field is offset from that of the even field by one horizontal period with respect to timing of pulse generation.

Based on the timing signal TM, the accumulation/transfer clock generating circuit 31S provides accumulation/transfer clocks $\Phi_S$ to the accumulating section S. This accumulation/transfer clocks $\Phi_S$ include a transfer clock for receiving the information charges transferred from the image pickup section I during the blanking period and another transfer clock for transferring the information charges to the horizontal transfer section H one line at a time. The transfer clock for receiving the information charges transferred from the image pickup section I during the blanking period is synchronized with the aforementioned vertical transfer clock $\Phi_I$. On the other hand, the transfer clock for transferring the information charges to the horizontal transfer section H is defined by pulses once every two horizontal periods. Therefore, the transfer of information charges from the accumulating section S to the horizontal transfer section H will be carried out every one horizontal period.

The timing of transfer to the horizontal transfer section H is offset by one horizontal scan period from one field to another. More particularly, as shown in FIG. 6, the transfer of charges in the odd field is performed during the first horizontal scan period in a pair of two horizontal scan periods while the transfer of charges in the even field is made during the second horizontal scan period.

Each time when the horizontal transfer section H receives the information charges from the accumulating section S, the horizontal transfer section H serially transfers the information charges in the horizontal direction. At the same time, the output of the horizontal transfer section H generates an image signal $X_{0(t)}$ formed by converting the amount of charge into a voltage value. The frequency of a horizontal transfer clock $\Phi_H$ for controlling the transfer at the horizontal transfer section H corresponds to the number of pixels in the horizontal direction in the image pickup section I and so selected that the output of information charges for one line will be completed within one horizontal scan period. The resulting image signal $X_{0(t)}$ contains image components for each horizontal line. At the same time, a horizontal line containing the image components in an odd field is offset from that in the even field by one horizontal line. The image signal $X_{0(t)}$ is then inputted into an image processing circuit 34 in which the image signal is subjected to various processings such as amplification and so on to provide an image signal $Y_{0(t)}$.

The image signal $Y_{0(t)}$ is supplied to an interpolating circuit 40 which comprises a delay circuit 40a and an adding circuit 40b. In the interpolating circuit 40, a horizontal scan period containing no image component is interpolated by a delayed image signal $Y_{1(t)}$. More particularly, the image signal $Y_{1(t)}$ offset from the image signal $Y_{0(t)}$ by one horizontal scan period includes the image components which are multiplexed on the horizontal scan period multiplexed by the image components of the image signal $Y_{0(t)}$. If these image signals $Y_{0(t)}$ and $Y_{1(t)}$ are added to each other, thus, an image signal $Y_{(t)}$ will be obtained in which the image components are multiplexed on each horizontal scan period. In this connection, the interpolating circuit 40 may be located upstream of the image signal processing circuit 34.

Figure 7A:
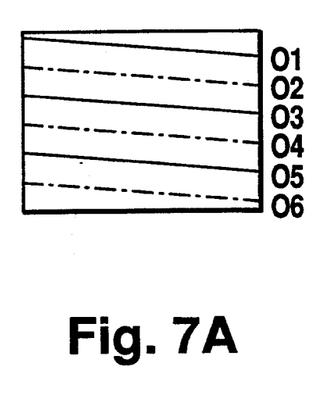
FIG. 7A showing an odd field and FIG. 7B showing an even field.
Figure 7B:
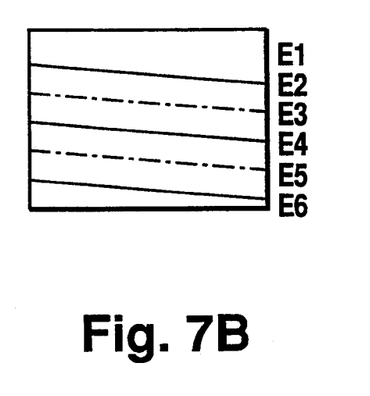

The image signal $Y_{(t)}$ is then inputted into the TV monitor 35 at which it is displayed on a reproduced scene by non-interlace scan. If an image taken by the image pickup element 10 is to be displayed by the non-interlace scan, an odd field will display odd-numbered scan lines 01, 03 and 05 from the image information of the image signal $Y_{0(t)}$ and even-numbered scan lines 02, 04 and 06 from the image information of the image signal $Y_{1(t)}$, as shown in FIGS. 7A and 7B. An even field will display even-numbered scan lines E2, E4 and E6 from the image information of the image signal $Y_{0(t)}$ and odd-numbered scan lines E3 and E5 from the image information of the image signal $Y_{1(t)}$. Since the even-numbered scan lines 02, 04 and 06 of the odd field and the odd-numbered scan lines E3 and E5 of the even field are formed from the image signal $X_{0(t)}$ by delaying the image information on one previous scan line by one horizontal scan period, these scan lines can be reproduced by the same information. The first scan line E1 in the even field will not be displayed at all since there is no scan line before this scan line. However, there is no problem since the first scan line is actually located at a position in which it cannot be observed on the TV monitor 35 by anyone.

If the resulting image signal $Y_{(t)}$ is reproduced on the TV monitor 35 by the non-interlace scan, all the scan lines will display the image information in the respective fields. Consequently, the contrast will not be reduced in comparison with the image pickup apparatus of FIG. 3 in which the image information is displayed on every one scan line.

The TV monitor usable in the present invention may be a double-matrix liquid-crystal display panel described, for example, in "Liquid-Crystal (Edited For Application)", pp 189–194, published from Kabushiki Kaisha BAIFUKAN, 1985. The double-matrix liquid-crystal display panel comprises pixels for two lines which are assigned to a single electrode. Thus, the number of scan electrodes can be reduced, so that the number of pixels can be increased in the vertical direction. Although the double-matrix liquid-crystal display panel displays pixels corresponding to two lines at a time, these pixels will not display the same signal since each of the pixels is connected to a signal electrode.

Figure 8A:
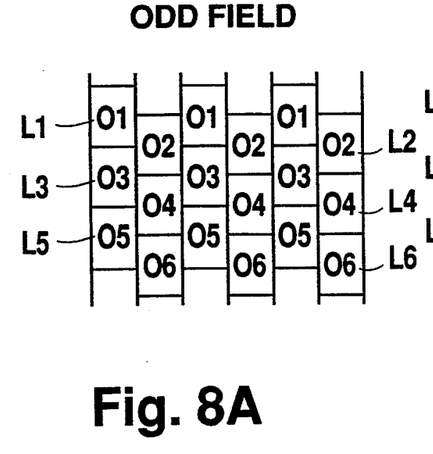
FIG. 8A showing an odd field and FIG. 8B showing an even field.
Figure 8B:
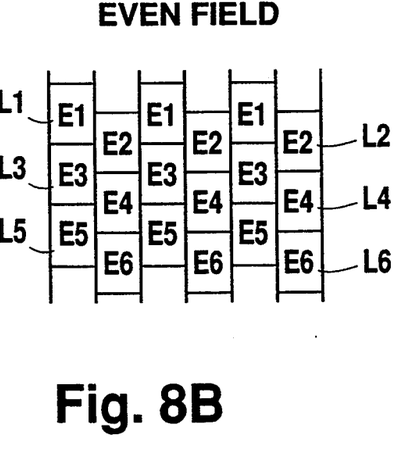

If such a double-matrix liquid-crystal display panel is used as the TV monitor 15 for displaying the image signal $Y_{(t)}$ obtained by the interpolating circuit 20 of this embodiment, the contrast and resolution can be effectively improved. It is particularly preferable that display pixels L1, L3 and L5 in an odd-numbered line and display pixels L2, L4 and L6 in an even-numbered line are alternately arranged, as shown in FIGS. 8A and 8B.

As shown in FIG. 7A, the signals in the odd field provided from the interpolating circuit 20 include the same signal for the paired horizontal scan lines (01, 02; 03, 04; and 05, 06), respectively. When these signals are supplied to the double-matrix liquid-crystal display panel, the horizontal scan lines (01, 02; 03, 04; and 05, 06) will be sequentially displayed for the successively paired horizontal scan periods.

On the other hand, the signals in the even field provided from the interpolating circuit 40 are the same for the paired horizontal scan lines (E2, E3; E4, E5), respectively, as shown in FIG. 7B. If these signals are applied to the double-matrix liquid-crystal display panel, the paired horizontal scan lines E1 and E2 will be displayed for the paired horizontal scan periods. Actually, only the horizontal scan line E2 will be displayed since the other horizontal scan line E1 has no image component. For the next paired horizontal scan periods, the horizontal scan lines E3 and E4 will be displayed. At this time, the image on the horizontal scan line E3 is the same as that on the horizontal scan line E2 displayed for the previous paired horizontal scan periods. However, the image displayed on the other horizontal scan line E4 is different from this. Further, the paired horizontal scan lines E5 and E6 are displayed for the next paired horizontal scan periods. Also in this case, the image displayed on the horizontal scan line E5 is the same as that displayed on the horizontal scan line E4, but the image on the horizontal scan line E6 is different from that on the horizontal scan line E4.

In this embodiment, thus, the image components are contained in all the horizontal scan lines in both the odd and even fields. These image components will be interlace displayed. The paired horizontal scan lines containing the same image components in the odd field are offset from those of the even field by one horizontal scan period. Thus, the false interlace scan can be carried out in the double-matrix liquid-crystal display panel.

When the image signals from the image pickup element driven in the interlace manner are supplied to the double-matrix liquid-crystal display panel in which the display pixels for each two lines are assigned to each single scan electrode and in which these display pixels are simultaneously displayed, the liquid-crystal display panel will apparently perform the false interlace display corresponding to the interlace driving at the image pickup element, in spite of the non-interlace scan on reproduction in the liquid-crystal display panel. As a result, the contrast and resolution in the reproduced scene can be prevented from being reduced. Each of the display pixels L1, L3 and L5 on an odd-numbered line is arranged offset from the corresponding one of the display pixels L2, L4 and L6 on an even-numbered line in the horizontal direction by one pixel. Therefore, the false interlace display can be made also in the horizontal direction. This also improves the resolution in the horizontal direction.

In such a manner, the present invention can provide a small-sized and inexpensive image pickup apparatus using a small-sized image pickup element which has the decreased number of pixels. At the same time, such an image pickup apparatus can prevent the reduction of contrast which would easily occur when any small-sized image pickup element is used, and provide an increased quality in the reproduced scene.

Particularly, when a monitor for displaying the reproduced scene is in the form of a double-matrix liquid-crystal display panel in which the display pixels are alternately arranged, it can extremely effectively display the image signals provided by the image pickup apparatus of the present invention. In addition, the present invention can provide an inexpensive image pickup apparatus which can provide an improved quality in the reproduced scene.

We claim:

1. An apparatus for producing a video display signal for a display having a first predetermined number of pixels in a vertical direction and a second predetermined number of pixels in a horizontal direction, including a solid state image pickup element having a number of pixels in the vertical direction which is less than said first predetermined number of pixels, said apparatus comprising:

an image pickup section having one-half of said first predetermined number of pixels in the vertical direction;

transfer means for outputting information charges obtained by said image pickup section in the vertical direction every other horizontal scan period, and for outputting said information charges obtained by said image pickup section in the horizontal direction for one horizontal period each time when said information charges are received, said transfer being adapted to provide a image signal having image components on every other horizontal line;

timing control means connected to said image pickup section for setting the vertical transfer timing in said transfer means such that the timing in an odd field will be offset from that in an even field by one horizontal scan period;

means connected to the output of said transfer means, for delaying the image signal outputted from said solid state image pickup element by one horizontal scan period and for synthesizing the delayed image signal with the image signal from said solid state image pickup element to multiplex delayed image components from delayed image signals on a horizontal line which contains no image component, wherein the same image information is repeatedly displayed on two lines to obtain an image signal having image components in all the horizontal scan periods; and reproduction means for reproducing an image on a monitor display by scan lines which are at the same positions in the odd- and even-numbered fields.

2. An apparatus as defined in claim 1, further comprising another transfer means for synthesizing and transferring the information charges accumulated at pixels on an odd-numbered line of said solid state image pickup element with the information charges accumulated at pixels on the next line in an odd field, and for synthesizing and transferring the information charges accumulated at pixels on an even-numbered line of said solid state image pickup element with the information charges accumulated at pixels on the next line in an even field.

3. An apparatus for producing a video display signal for a display having a first predetermined number of pixels in a vertical direction and a second predetermined number of pixels in a horizontal direction, a number of pixels in the vertical direction which is less than said first predetermined number of pixels, said apparatus comprising:

an image pickup section having one-half of said first predetermined number of pixels in the vertical direction;

transfer means for outputting information charges obtained by said image pickup section in the vertical direction every other horizontal scan period, and for outputting said information charges obtained by said image pickup section in the horizontal direction for one horizontal period each time when said information charges are received, said transfer being adapted to provide a image signal having image components on every other horizontal line;

timing control means connected to said image pickup section, for setting the vertical transfer timing in said transfer means such that the timing in an odd field will be offset from that in an even field by one horizontal scan period;

means connected to the output of said transfer means, for delaying the image signal outputted from said solid state image pickup element by one horizontal scan period and for synthesizing the delayed image signal with the image signal from said solid state image pickup element to multiplex delayed image components from delayed image signals on a horizontal line which contains no image component; and reproduction means including a double-matrix liquid crystal display panel for displaying image information of interpolated signals in all horizontal scan periods; said double-matrix liquid crystal display panel including display pixel rows arranged in a zigzagged manner, and displaying pixels in a row for two lines at a time, and each pixel indicating independent pieces of information.

4. An apparatus as defined in claim 3, wherein said reproduction means provides every two lines of the image signal from said interpolating means, which are obtained from said solid state image pickup element for one line and the delayed image signals for one line to display pixels for two lines which are scanned in common in said liquid-crystal display panel, thereby simultaneously reproducing the display pixels for said two lines.

5. An apparatus as defined in claim 3, wherein said reproduction means reproduces said delayed image signal for one line on an even-numbered line of said liquid-crystal display panel in an odd field and said delayed image signals on an odd-numbered line of said liquid-crystal display panel in an even field.

* * * * *